July 14, 1970  H. HOEFENER  3,520,009
AUTOMATIC COMBINATION DRILLING AND TAPPING MACHINE
Filed June 27, 1967  4 Sheets-Sheet 2

INVENTOR.
HOWARD HOEFENER
BY
ATTORNEY

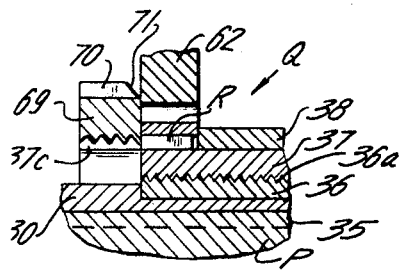
FIG.4
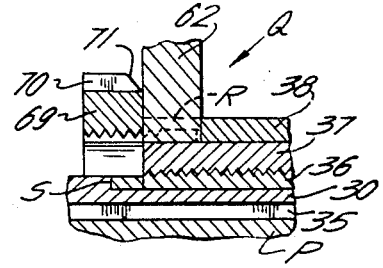
FIG.5
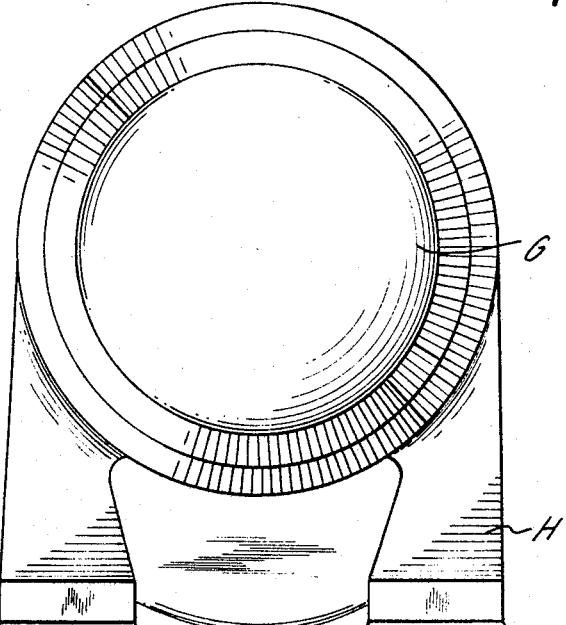
FIG.6
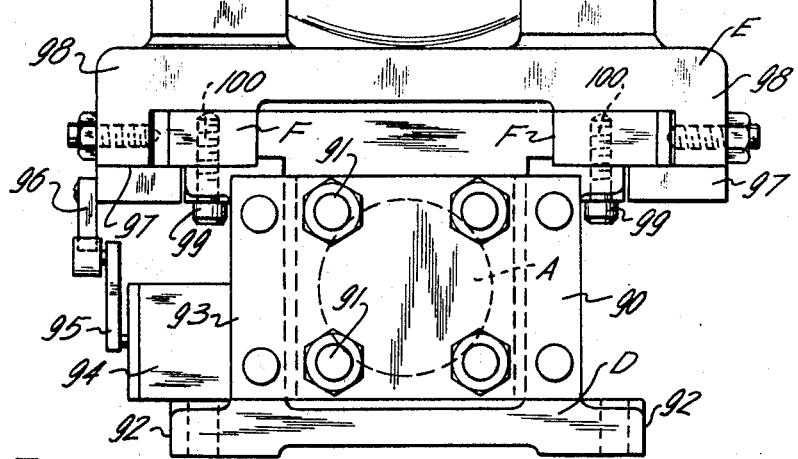
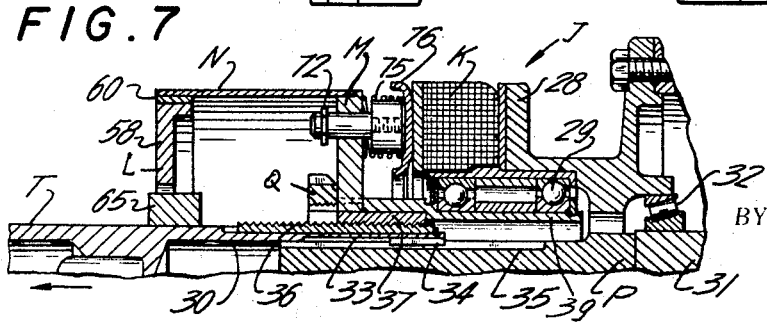
FIG.7
INVENTOR.
HOWARD HOEFENER
BY
ATTORNEY July 14, 1970  H. HOEFENER  3,520,009
AUTOMATIC COMBINATION DRILLING AND TAPPING MACHINE
Filed June 27, 1967  4 Sheets-Sheet 4

INVENTOR.
HOWARD HOEFENER

BY

ATTORNEY

United States Patent Office 3,520,009
Patented July 14, 1970

3,520,009
AUTOMATIC COMBINATION DRILLING AND TAPPING MACHINE
Howard Hoefener, River Vale, N.J., assignor to Hydrotherm, Inc., Northvale, N.J., a corporation of New Jersey
Filed June 27, 1967, Ser. No. 649,326
Int. Cl. B23g 1/00
U.S. Cl. 10—87                               1 Claim

ABSTRACT OF THE DISCLOSURE

The disclosure describes an automatic combination drilling and tapping machine which will automatically rotate and feed a drill point and follow it up with a tap, advancing the tap accurately by a lead screw. Then a reverse motion takes place to remove the tap and the drill and finally retract to the initial position in readiness for the next cycle.

---

A hydraulic slide unit is used to advance or retract the entire combination tool having both drilling and tapping instrumentalities; and the mechanism which is advanced and retracted includes an electric motor and and a lead screw arrangement.

An adjustable stop screw as well as limit switches are used to control the drilling cycle. The present machine in one setting automatically performs drilling and tapping operations.

BRIEF SUMMARY AND GENERAL STATEMENT OF THE INVENTION

The present invention relates to an automatic combination drilling and tapping machine and although it will be particularly described in connection with such a drilling and tapping machine for successively drilling and tapping openings in cast iron units such as those for gas fired cast iron hot water boilers, it is understood that the drilling and tapping machine of the present invention has broader application.

It is among the objects of the present invention to provide a simple, durable, inexpensive, automatic combination drilling and tapping machine for drilling and tapping cast iron units, particularly to provide flow passageways therethrough which can be readily associated with conduits or conduit connections and which will do so with a minimum of servicing and manual attention and a maximum of automatically and economy per unit operation.

Another object is to provide an automatically controlled successive drilling and tapping operation for light weight, relatively thin metal parts or castings, in which the tool will be automatically presented and retracted without need of manual intervention and with assurance of high accuracy in the drilling and tapping operations.

A further object is to provide a novel drilling and tapping machine and method in which both drilling and tapping operations will be automatically accomplished with one setting of the machine and with one piece of equipment.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide an automatic combination drilling and tapping unit which will have a tool consisting of a combination initial drill followed by a tap which will be carried on a shaft capable of being advanced and rotated by means of an electric motor with an associated electric brake and clutch. The entire unit is mounted so that it can move forwardly and be retracted by means of a hydraulic cylinder arrangement.

Although a hydraulic cylinder is preferred, a mechanical advance may be achieved through a power screw or a rack and pinion or a chain. In addition, in lieu or in substitution of an electrical brake, there may also be utilized an air or mechanical brake.

Essentially, the device will automatically rotate and feed a tool having a forward drill point followed by a tap by a lead screw arrangement, with the mechanism being programmed to remove the tap and then the drill and finally to retract the entire mechanism to the initial position, in readiness for the next cycle.

Initially, the hydraulic slide or advancing unit will move the entire motor, lead screw and tool toward the work piece. Then the drilling operation is accomplished. An adjustable stop screw arrangement as well as limit switches are desirably used to control the drilling cycle.

Upon completion of the drilling cycle, a limit switch is closed and through an appropriate circuit arrangement an electrical brake or, less preferably, an air or mechanical brake will be energized. This electrical brake application causes the threaded advancing nut to cease turning, as this would otherwise turn with the main spindle as a result of the braking action.

When the threaded nut is caused to remain stationary, the main spindle will advance away from the motor drive at a rate set by the pitch of the screw. The rotational motion is imparted to the main spindle by the motor drive by means of a splined connection.

Since the pitch is made equal to that of the tap being used, the tap will advance into the hole at a proper rate, cutting the thread as it progresses. At the end of the prescribed tapping travel, another limit switch is tripped, causing the motor to reverse.

The tap will recede from the hole and at the same time the lead screw will reset itself to the starting position in the nut. After the lead screw is properly reset in initial position another limit switch may be engaged to cause the circuitry, including the reversing circuit and the electrical brake circuitry, to be discontinued. This will also actuate the hydraulic valve to return the equipment, and the unit will also be retracted to its initial position in readiness for the next machining cycle.

The device, therefore, in one setting will automatically do both the drilling and tapping operations.

The work piece does not have to be changed in position, nor does there have to be any repositioning or reclamping of the work piece. In the operation, the spindle will be advanced at a rate governed by the lead screw and will match accurately the predetermined design rate and subsequently there will be a reversal of direction and a retraction of the spindle, to the initial starting position at the same accurately predetermined rate.

BRIEF DESCRIPTION OF THE DRAWINGS

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can besorted to which fall within the scope of the claims hereunto appended.

In the drawings, wherein like reference characters denote corresponding parts throughout the several views:

FIG. 4 is a fragmentary transverse sectional view taken upon the line 4—4 of FIG. 3;

FIG. 5 is a fragmentary transverse sectional view similar to FIG. 4 taken upon the line 5—5 of FIG. 3;

FIG. 6 is an end elevational view from the right of FIG. 1;

FIG. 7 is a fragmentary transverse sectional view of one side of the brake arrangement showing the advance of the tool;

DESCRIPTION OF THE PREFERRED EMBODIMENTS

Figure 1:
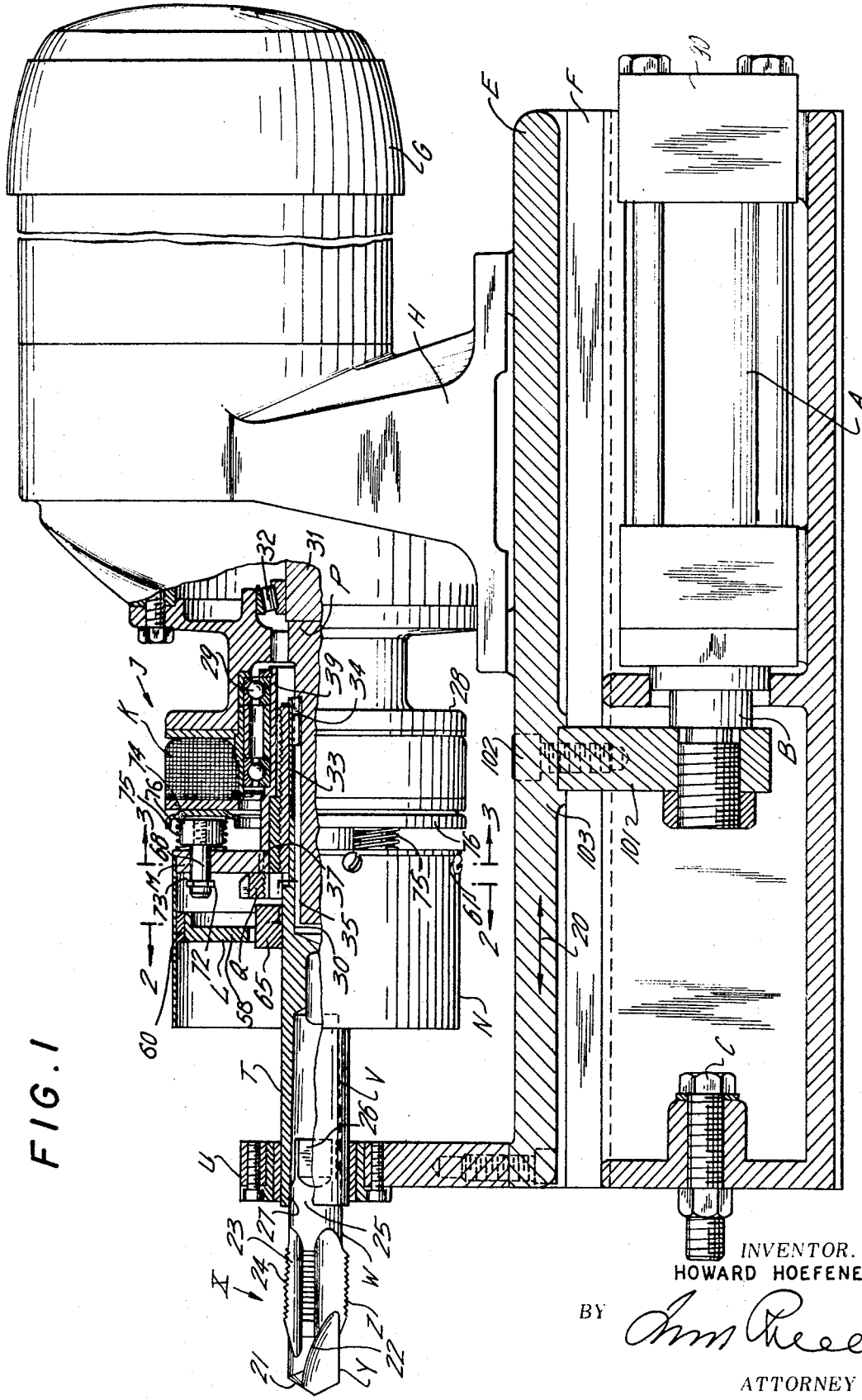
FIG. 1 is a side elevational view partly in section of the drilling and tapping mechanism of the present invention.

Referring to FIG. 1, there is shown the hydraulic cylinder A having the connecting rod B and the adjustable stop nut C. The hydraulic cylinder A has a base and support D and it carries the slide E having the ways F (see also FIG. 6).

Mounted on the slide E is the electric motor G having the base support H. The electric motor carries the electric brake and clutch unit J having the solenoid K, the brake shoes L and the clutch arrangement M. The brake drum N consists of a shell.

The motor may be a US synchrogear motor type JFGR, whereas the electric brake may be a Warner electric brake of the magnetic type PB–500. The spline shaft P is provided with a nut arrangement Q having tabs R and S (see FIGS. 4 and 5).

The shaft extension T has a bearing U and it has a conical receptacle V which receives the base W of the combination tool X having a drilling portion Y and a tapping portion Z. The slide E will move back and forth as indicated by the arrow 20 carrying the motor G, the shaft P, the electric brake K and the tool X.

Referring specifically to the tool, it will be noted that it has a point Y having the bevelled end portion 21 and the cutting edges 22. Rear of the cutting edges 22 are the recesses 23 and the thread cutters 24. The shank W is tapered as indicated at 25 and it has a flattened back portion 26 which is not utilized for holding the tool. The recess V in the end of the separable shaft extension T is tapered so as to tightly clinch the tool as indicated at 27.

The brake structure itself is mounted on the plate 28 (see FIG. 1) and it has the internal ball bearings 29 which permit rotation of the shaft P when the brake is actuated. The shaft extension T has a recess 30 (see FIG. 7) which extends to the right and encircles the shaft P extending outwardly and moving with the motor shaft 31 inside of the roller bearings 32.

The telescoping outer shaft portion 30 has a shallow slot 33 which receives the sliding key 34 sliding in the recess or slot 34. It will be noted by comparing FIGS. 1 to 7 that in FIG. 1 the outer shaft extension T has been moved to the right as compared to the inside extension P, whereas in FIG. 7 it has been moved to the left.

Figure 2:
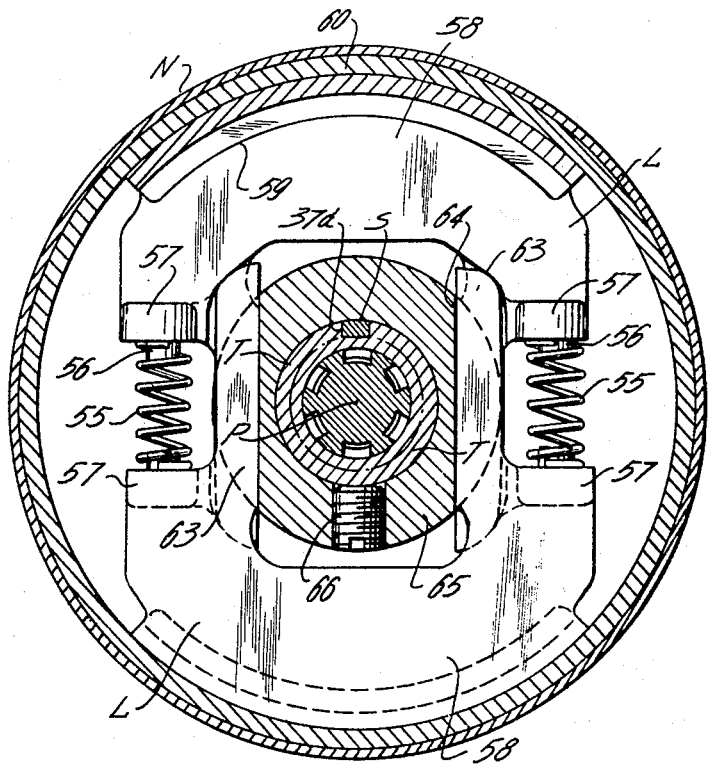
FIG. 2 is a transverse sectional view upon the line 2—2 of FIG. 1, showing part of the electric brake and clutch arrangement.

Around the extension 30 is the threaded sliding member 36 which in turn engages and is threaded in the centrally threaded member 37 (see FIGS. 1 and 2). These members are positioned inside of the brake structure J and inside of the drum N. Outside of the member 37 as shown in FIGS. 1, 4, 5 and 7 is an extension 38 which carries at 39 the inside of the ball bearing structure 29.

Referring to FIG. 2, there is shown the upper and lower brake shoes L which are held apart by means of the coil springs 55 extending between the nipples or studs 56 and attached to and reacting against the outstanding lips 57. These brake shoes are provided with the base portions 58 which carry the shoe portions 59 having the brake faces 60 which contact the inside face of the drum N. This drum is held in position by means of the screws 61 (see FIGS. 1 and 3) on the base plate member 62.

The clevis members extend inwardly from the shoes 58 and they have the opposite arms 63 (see FIG. 2) which slide alongside of one another in recesses 64 in the central member 65 serving as a brake shoe guide. The brake shoe guide 65 has a set screw 66 which abuts against the shaft T.

The base plate member 62 has the openings 67 through which pass the studs 68 of the brake structure.

Figure 3:
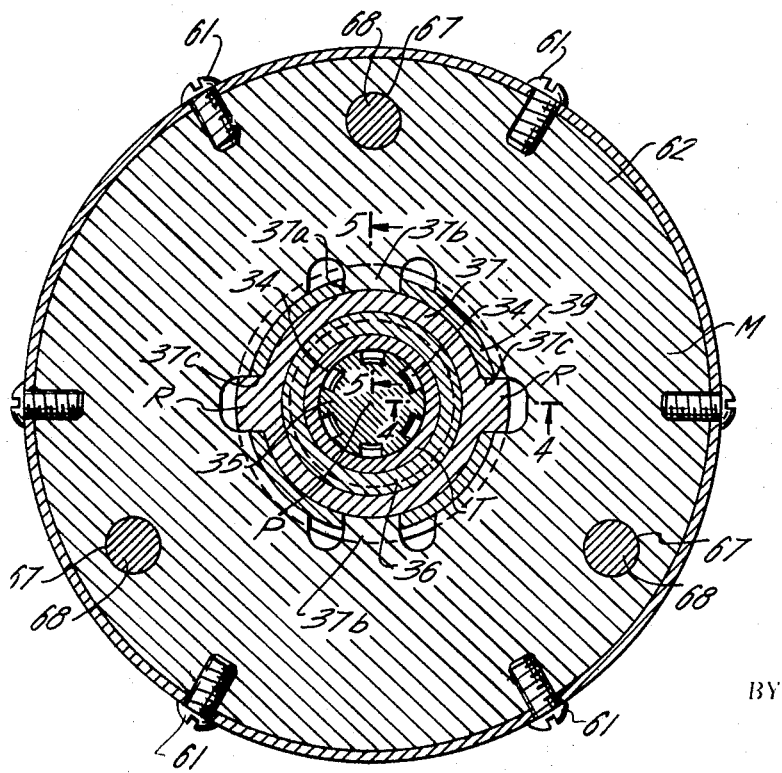
FIG. 3 is a transverse sectional view upon the line 3—3 of FIG. 1, showing the brake and clutch arrangement.

Referring to FIGS. 3, 4 and 5, the internally threaded member 69 has the extension 70 bevelled at 71. This extension 69 is positioned directly against the face of the base plate member 62.

The studs 68 as shown in FIG. 1 have the head portions 72 which carry the conical springs 73 and they have the inside enlargements 74 which carry the springs 75. These springs will react between the base plate 62 and the dished supporting ring 76.

Referring to FIG. 6, the back structure 90 carries the bolts 91 and it has the extension feet 92. Along the side 93 of the base is the limit switch arrangement 94 having the arms 95 actuated by the moving members 96 which move with the slide E.

The members 96 are attached to the lower portions 97 mounted on the sides 98 of the slide E which extend under the ways F. The ways F are mounted in position by the bolts 99 which extend into the ways as indicated at 100. The motor base H is mounted on top of the sliding structure E.

Figure 9:
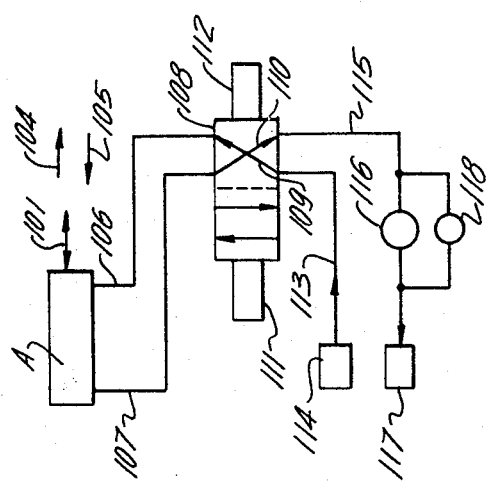
FIG. 9 is a diagrammatic layout of the hydraulic control arrangement.

Referring to FIG. 9, there is shown a schematic of the hydraulic operation. The hydraulic cylinder A is connected to the platen 101 (see also the lower part of FIG. 1) having a bolt connection 102 to the portion 103 of the platform E.

The arrow 104 indicates the infeed to move the platen 101 in FIG. 1 to the left, whereas the arrow 105 indicates the return to cause return movement of the platen. The lines 106 and 107 to the ends of the hydraulic cylinder pass through the valve arrangement 108 which may reverse the flow in accordance with the crossing arrows 109 and 110.

This valve arrangement is provided with the control solenoids 111 and 112. The line 113 indicates fluid under pressure from the hydraulic pump at 114. The line 115 leads to the third solenoid valve 116 and then to the sump 117. Bypassing the valve 116 is the flow adjustment 118.

Figure 8:
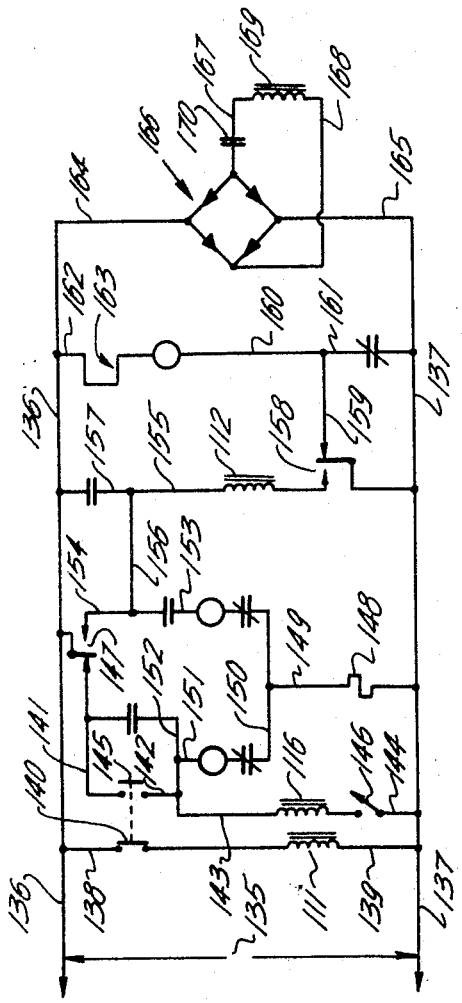
FIG. 8 is a diagrammatic layout of the circuitry or control circuits for the automatic arrangement.

Referring to the control circuit shown in FIG. 8, there is shown a voltage 135 which may be 115 volts across the lines 136 and 137. The solenoid valve 111 is connected by the lines 138 and 139 across the lines 136 and 137 by the manual push button switch 140 which will initiate the cycle.

The solenoid valve 116 is also connected across the lines 136 and 137 by the lines 141, 142, 143 and 144. The push button switch 140 also has a second contact system 145 on said line 141–2 to open and close the connections therebetween.

The switch 146 is closed at the end of the rapid advance stroke actuated by the slide 101. The switch arrangement 147 is closed at the end of the tapping stroke actuated by the forward or advance movement of the spindle.

The overload relay 148 on the line 149 connects between the main line 137 and the branch line 150. The branch line 150 leads to the extension 151 to the line 152 which controls the forward stroke and the line 153 leads to the connection 154 which controls the reverse stroke.

The solenoid valve 112 is mounted on the line 155 which has a branch connection 156 to the line 154 and another connection 157 to the line 136. The line 155 at its lower end as shown in FIG. 8 connects to the relay 158 which will be closed at the end of the retraction of the tapping element and actuated by the spindle return movement.

The relay is also connected to the line 159 which leads to the transverse line 160 having the lower branch 161 and the upper branch 162 connected by the switch 163 at the end of the drilling operation where it is actuated by the advance motion of the sliding element 101. The brake actuation motion is shown at the right of FIG. 8 and it has the lines 164 and 165 connected to the bridge member 166. The bridge member 166 has the connecting lines 167 and 168 to the solenoid 169.

Referring to FIGS. 8 and 9, in operation the actuation of the button or manual actuator 140 of FIG. 8 will shift the valve arrangement 108 of FIG. 9 to the advancing position which will cause the hydraulic cylinder to advance the element 101. At this stage the relay 147 will be closed and held in closed position.

At the same time the switch 146 will be closed by the movement of the hydraulic cylinder and this will close the solenoid valve 116. Any return flow is restricted by the adjustment 118 to achieve the forward desired feed rate.

With the switch 163 closed, the brake arrangement 166 will be energized, initiating advance of the tapping portion of the tool. The brake 166 will be actuated by closing of the element 170. Now the switch 147 will be actuated, reversing the system and providing for reversing of the motor G and withdrawing of the tap Z.

Then the switch arrangement 158 will be actuated, releasing the brake 166 and stopping the motor G. The solenoid valve 112 will then be energized, causing the hydraulic cylinder to return the member 101 to its initial starting position.

In operation, the hydraulic cylinder A will automatically advance the slide E and rotate and feed the drill point Y, followed by the tap Z by means of the motor, through the rear shaft P and the forward extension shaft T. The entire motor G and tool arrangement X will be advanced toward the work piece not shown by movement to the left of the slide E as indicated by the double arrow 20.

The limit switches as indicated in FIG. 6 at 94 will be placed along the side of the slide and upon the housing of the hydraulic pump or cylinder A.

In the first step, the drilling cycle is completed, with the penetration of the drill portion Y of the tool X. When this is completed, the limit switch is closed and the electric brake J is energized, which will stop the movement of the nut Q. When the nut Q is caused to remain stationary, the main spindle T or the extension of the shaft P will move to the left with the tapping portion Z cutting the desired thread.

This movement will be at a rate set by the pitch of the screw arrangement between the elements 36 and 37. The rotational movement imparted to the extension or main spindle T by means of the splined connection 33 will result in cutting of a thread at the proper rate as the penetration of the tapping portion Z continues.

At the end of the tapping operation another limit switch will be actuated, causing the motor G to reverse. Thereupon the tool X will recede from the tapped opening.

After the lead screws have been reset in their initial position the reversing circuit, the motor circuit and the electric brake circuit will all be discontinued and the hydraulic valve will thus be restored to its initial position.

The tab or key S, as shown in FIGS. 2 and 4, is received in the slot or recess 37d in the tool carrying member T and it holds the engaged threaded elements 36 on the inside, and 37 on the outside, together in controlling the advance of the tapping portion Z of the tool, as shown at the left of FIG. 1. The outside tabs or keys R as shown on the piece 37 fit into the slots 37c ( see FIGS. 3, 4 and 5) and hold the sleeve 37 and the structure M together, as shown in FIG. 3.

As indicated in FIG. 4, the threaded connection will not be subject to relative movement during the drilling operation, but it will be subject to such movement during the tapping operation. The tab or key S and the piece 30 normally engage during the entire operation, as shown in FIG. 5, and hold the pieces or structures 36 and 30 together.

During the tapping operation the hydraulic motor A will advance the slide E without the brake J being actuated until it is stopped against the stop C in FIG. 1. Then the brake is applied and the structures P and T will rotate together and there will be relative movement or shift along the threaded connection 36a between the threaded elements 36 and 37, causing the tapping portion Z of the tool X to undergo tapping operation. The nut element Q as shown in FIG. 1 will lock the structures 62 of the brake in position and it is threaded flush against the left hand face of the plate 62.

The keys or extensions 34, as shown in FIG. 1, are part of the tool holder T and they slide axially in respect to the shaft P during rotation of the shaft P and the tool holder T in the tapping operation.

During the drilling operation they move together with the brake, all of which rotate together. As indicated best in FIGS. 2 and 3, the slots 37c receive the tabs or keys R, whereas the slot 37a receives the tab or key S. The structure 37, as shown in FIG. 3, has grooves 37a to receive the extensions 37b of the plate 62 of the brake drum M.

As many changes could be made in the above automatic combination drilling and tapping machine, and many widely different embodiments of this invention could be made without departing from the scope of the claim, it is intended that all matter contained in the above description shall be interpreted as illustrative and not in a limiting sense.

Having now particularly described and ascertained the nature of the invention, and in what manner the same is to be performed, what is claimed is:

1. A drilling and tapping tool having a forward drill portion and a rearward tapping portion, a forward shaft for rotating and advancing the same, a rear shaft connected to the forward shaft, a motor to drive the forward and rear shafts, a brake arrangement to cause discontinuation of the drilling operation when the tool advances to accomplish the tapping operation, a screw connection to advance the tapping portion of the tool, a splined connection to advance the drill portion of the tool, a slide carrying the motor, the brake arrangement, the forward and rear shafts and the penetration tool and a hydraulic cylinder to advance and retract said slide, said hydraulic cylinder advancing said penetration tool automatically through the peneration of the drill portion and the tapping portion while being actuated by the motor without change in position of the tool, said forward and rear shafts being continuously rotated by said motor and means to advance the forward drilling portion at an adjustable rate and subsequently the tapping portion at a fixed predetermined rate, a lead screw to control the advance of the tapping portion of the tool after the drilling operation has been completed, said unit being provided with a control circuit to reverse the direction of movement of the slide when the drilling and tapping has been completed and to return the shafts and slide to their initial starting position, and a hydraulic and electrical circuit arrangement to first cause advance of the drill portion at a forward speed and rate and then subsequently the tapping portion at a predetermined speed and rate, said brake arrangements being mounted on a plate and having internal ball bearings to permit rotation when the brake is actuated to cause discontinuation of the drilling operation, said tool having a beveled end portion provided with cutting edges and being recessed between the forward drill portion and the rearward tapping portion, there being a shaft extension provided with a bearing and having a conical receptacle, and said penetration tool having a base portion received in said conical receptacle, there being a separable tapered shaft extension, and said tool being tightly clinched on said tapered portion.

References Cited

UNITED STATES PATENTS

| | | | |
|---|---|---|---|
| 2,587,352 | 2/1952 | Manning | 10—139 |
| 2,813,280 | 11/1957 | Huffman | 10—140 |
| 3,013,285 | 12/1961 | Arengo | 10—139 |
| 3,058,129 | 10/1962 | Sullivan | 10—139 |
| 3,134,996 | 6/1964 | Retz | 10—139 |
| 3,178,740 | 4/1965 | Dorak | 10—139 |
| 3,191,205 | 6/1965 | Gilbert | 10—139 |
| 3,344,450 | 10/1967 | Russo | 10—87 |
| 3,346,894 | 10/1967 | Lemelson | 10—140 |
| 3,389,413 | 6/1968 | Van Den Kieboom | 10—139 |

CHARLES W. LANHAM, Primary Examiner

E. M. COMBS, Assistant Examiner